United States Patent [19]

Morris

[11] 4,270,143
[45] May 26, 1981

[54] CROSS-CORRELATION VIDEO TRACKER AND METHOD

[75] Inventor: Edwin E. Morris, Clinton, N.Y.

[73] Assignee: General Electric Company, Utica, N.Y.

[21] Appl. No.: 971,197

[22] Filed: Dec. 20, 1978

[51] Int. Cl.³ .................. H04N 7/18; G01S 13/00
[52] U.S. Cl. .................. 358/125; 364/516; 358/105
[58] Field of Search .............. 358/125, 126, 105; 364/516; 250/203 CT; 244/3.16

[56] References Cited

U.S. PATENT DOCUMENTS

| | | | |
|---|---|---|---|
| 3,632,865 | 1/1972 | Haskell et al. | 358/133 |
| 3,641,266 | 2/1972 | Stults et al. | 358/105 |
| 3,700,801 | 10/1972 | Dougherty | 358/125 |
| 3,733,434 | 5/1973 | Weinstein | 358/125 |
| 3,743,768 | 7/1973 | Copland | 358/33 |
| 3,769,456 | 10/1973 | Woolfson | 358/125 |
| 3,781,468 | 12/1973 | Chomet et al. | 358/105 |
| 3,823,261 | 7/1974 | Bolsey | 358/105 |
| 3,828,122 | 8/1974 | McPhee et al. | 358/125 |
| 3,829,614 | 8/1974 | Ahlbom et al. | 358/125 |
| 3,836,710 | 9/1974 | Takahashi | 358/105 |
| 3,890,462 | 6/1975 | Limb et al. | 358/125 |
| 3,903,361 | 9/1975 | Alpers | 358/125 |
| 3,932,703 | 1/1976 | Bolsey | 358/105 |
| 3,943,277 | 3/1976 | Everly et al. | 358/125 |
| 3,950,611 | 4/1976 | Callis et al. | 358/125 |
| 3,953,670 | 4/1976 | Prince | 358/125 |
| 3,955,046 | 5/1976 | Ingham et al. | 358/125 |
| 3,988,534 | 10/1976 | Sacks | 358/125 |
| 4,004,083 | 1/1977 | Norem | 358/125 |
| 4,034,208 | 7/1977 | Vaeth et al. | 358/125 |
| 4,053,929 | 10/1977 | Collins et al. | 358/126 |
| 4,060,830 | 11/1977 | Woolfson | 358/126 |
| 4,133,004 | 1/1979 | Fitts | 358/125 |

*Primary Examiner*—Jin F. Ng
*Assistant Examiner*—Edward L. Coles
*Attorney, Agent, or Firm*—Ralph M. Savage

[57] ABSTRACT

A cross-correlation video tracker and method for automatically tracking a relatively moving scene by storing elements from a frame of a video signal to establish a reference frame and comparing elements from a subsequent frame with the stored reference frame to derive signals indicating the direction and angular distance of scene relative movement. A cross-correlation difference signal is generated which represents the difference between a pair of cross-correlation signals dependent on the correlations of the subsequent frame elements and the stored reference elements at two predetermined opposite relative shifts. A circuit is responsive to this difference signal for generating an error signal indicative of the amount of shift required to center the stored reference frame with respect to the subsequent frame. In order to maintain feedback loop stability as the system tracks different scenes which result in varying degrees of decorrelation even with constant shifts in scene position, the circuit responsive to the error signal is also responsive to a gain control signal which represents the difference between a pair of autocorrelation signals dependent upon the correlations of the elements of a representative frame of the video signal at substantially a zero shift and at a fixed predetermined shift. The representative frame of the video signal may be either the subsequent frame or the stored reference frame.

32 Claims, 20 Drawing Figures

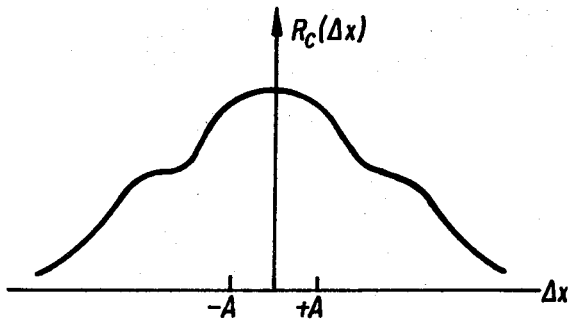
FIG. 1
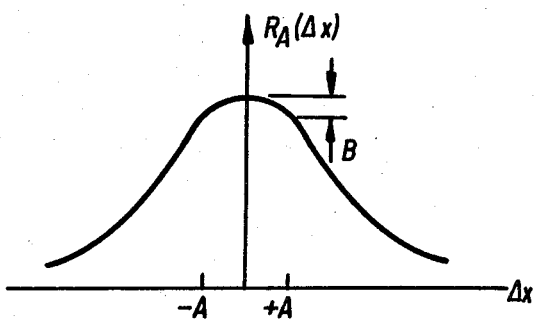
FIG. 6
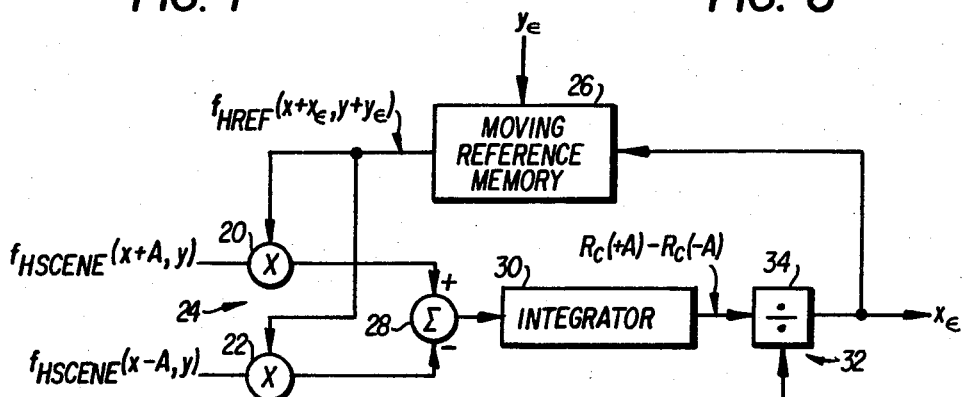
FIG. 4
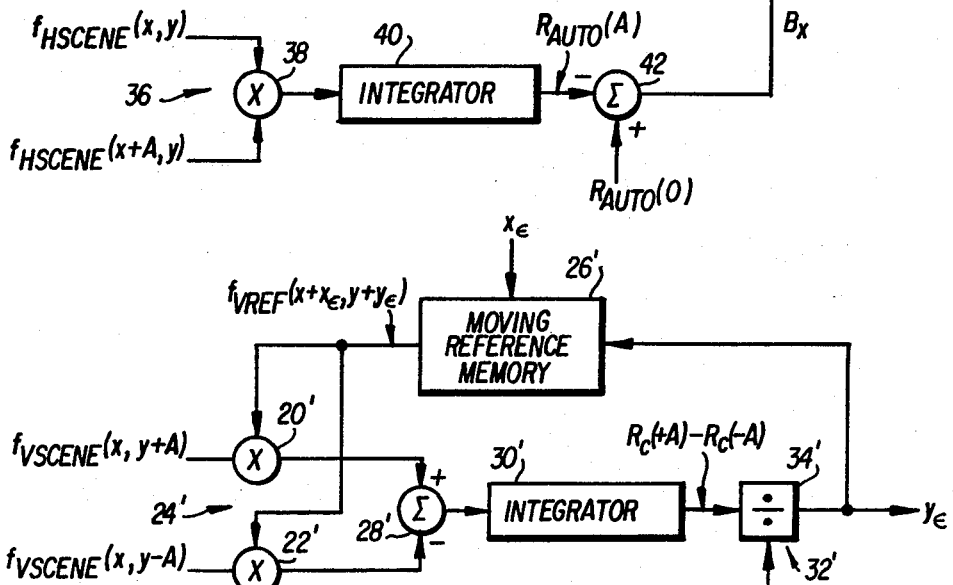
FIG. 5
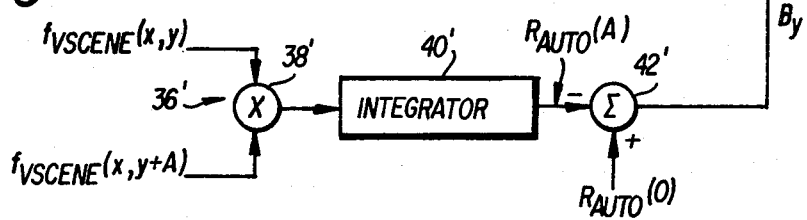

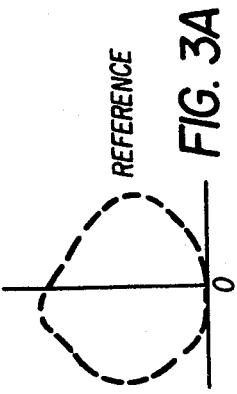
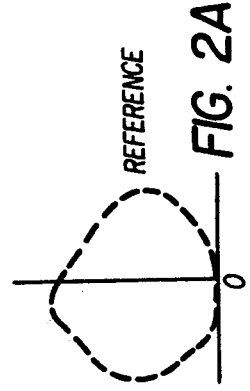

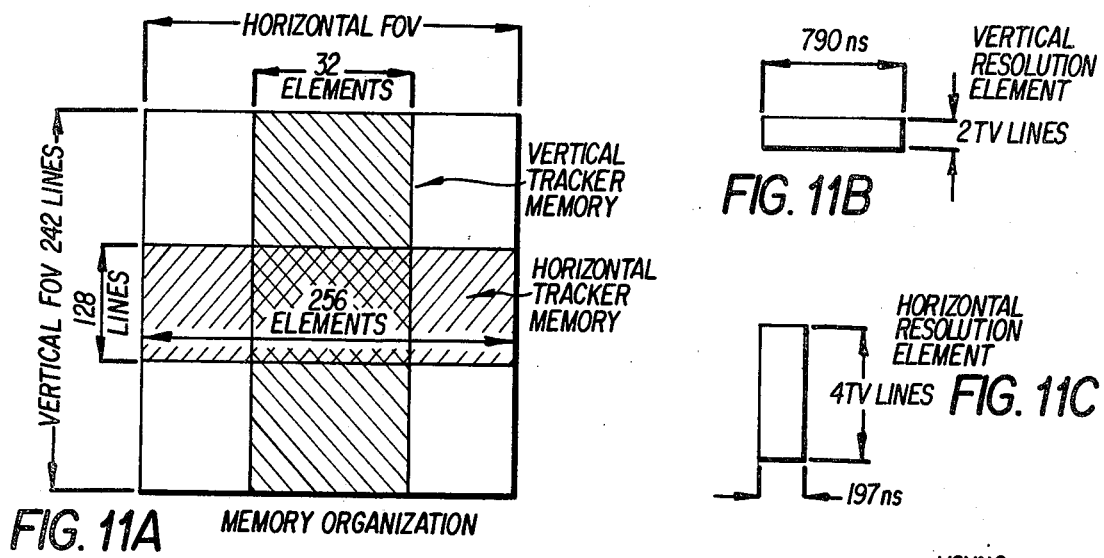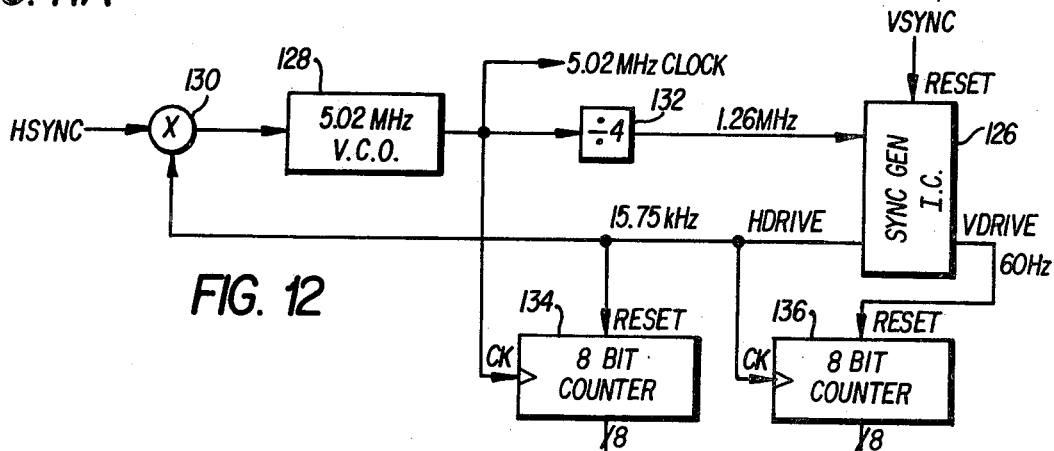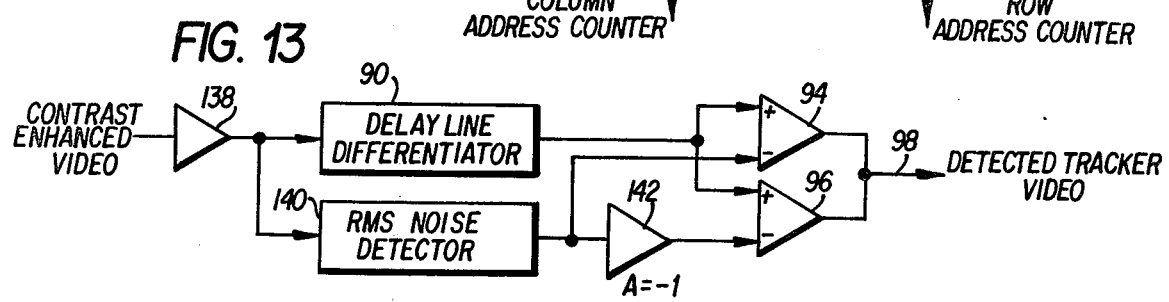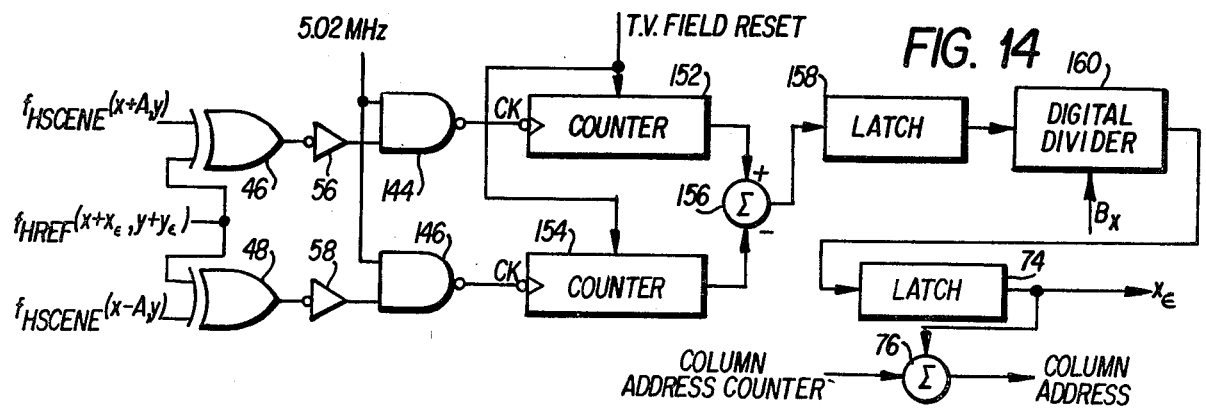

CROSS-CORRELATION VIDEO TRACKER AND METHOD

BACKGROUND OF THE INVENTION

The present invention relates to a system using a cross-correlation technique for automatically tracking a relatively moving scene viewed by a video sensor by storing elements from a frame of a video signal to establish a reference frame and comparing elements from a subsequent frame of the video signal with the stored reference frame to derive signals indicating the direction and angular distance of scene relative movement.

Video tracking systems generally comprise a gimbaled video sensing means, such as a television camera, included within an overall feedback loop and controlled by azimuth and elevation servos such that the television camera remains directed at a relatively moving scene. The azimuth and elevation servos may be controlled either manually using for example a joystick, or automatically in response to the output of an automatic video tracker. The output signals of automatic video trackers are known in the servomechanism art as error signals, and indicate to the servos the direction and velocity of movement required to aim the camera exactly at a target.

One particular use for such a system is as an airborne video tracker (mounted on a gyro-stabilized platform) for stablizing a television image of a relatively moving target for example a ship, such that identifying indicia including numbers may be more easily recognized.

One type of video tracker is a cross-correlation tracker. In a typical cross-correlation tracker, a frame of incoming video data is stored as a reference. As subsequent video frame data arrives, the cross-correlation function of the reference frame with the subsequent frame data shifted into a large (for example thirty-two) number of positions is computed. The position, both horizontal and vertical, of greatest correlation is then detected and used as the position error feedback signal. It will be appreciated that the terms video signal or video data as used herein have their usual meaning of a signal which sequentially represents picture elements (pixels) in a field of view taken in a prearranged order which repeats itself, each sequence of pixels being termed a frame.

As is known, the value or magnitude of a cross-correlation function may be determined by relatively shifting two complete frames of scene data and multiplying each picture element (pixel) value in one frame by the corresponding pixel value in the other scene, and then integrating the product over the area of the complete scene. The term "shift" as employed herein means either a positional shift or an equivalent time shift or delay. It will be appreciated that with a conventional television raster scan, pixel data are rapidly generated in a serial stream and appropriate time delays may conveniently employed to in effect produce equivalent positional displacements. Accordingly, the term "shift" is for convenience herein employed to denote either of these equivalent shift types.

In one particular implementation, a three-dimensional reference of the input video signal is stored, and the two-dimensional correlation function is calculated for many points in either the time domain or in the frequency domain using a fast Fourier transform method. Use of a fast Fourier transform scheme to find the relative positions of maximum correlation reduces somewhat the amount of hardware required.

Patented prior art examples of the general type of cross-correlation tracker described above are U.S. Pat. Nos. 3,632,865—Haskell et al; 3,700,801—Dougherty (employing a Fourier transform); 3,828,122—McPhee et al; 3,829,614—Ahlbom et al; and 3,955,046—Ingham et al.

One significant disadvantage shared by these typical prior art cross correlation video trackers is that a fairly large amount of hardware is required to rapidly calculate the values of the plurality of correlation functions, precluding the use of the technique for most tracking requirements. Depending upon the precise arrangement, the number of calculations required may be even so great as to preclude operation in real time. A further disadvantage and one related to performance, is that the output error signal tends to jump in discrete steps corresponding to the individual shifted positions of the cross-correlation calculations, resulting in a "bang-bang" servo control loop.

Another approach to correlation tracking is disclosed in U.S. Pat. No. 3,943,277—Everly et al wherein positional error signals are derived by taking the analog difference between the integrated outputs of a pair of coincidence circuits which compare video scene elements stored in a recirculating shift register with elements of present video. One set of coincidence circuits compares each present element with shift register stored elements above and below the present element, and another set of coincidence circuits compares each present element with shift register stored elements on both sides.

In addition to correlation type video trackers, there are a number of other video tracker types which will now briefly be mentioned. Single edge trackers require a signal to noise ratio of better than 6:1, and require the operator to manually place a small tracking window on the edge of a target. Once the track function is initiated, the window tends to wander around the edge of the target, resulting in noise to the servo-gimbal. Since the gate is small (to reduce noise), it is easy for the tracker to loose the edge and to break lock. The edge tracker has a very low probability of holding onto an edge during field view changes.

Edge boundary trackers solve the edge wander problem of the simple edge tracker. They have a tracking gate which can be designed to expand automatically and enclose a target. This tracking technique requires an enclosed boundary target to operate properly, and therefore has a relatively poor chance of maintaining lock through a field of view change.

Total scene centroid trackers operate at a much lower signal-to-noise ratio compared to the edge trackers. The centroid tracker works well until the detected target fills the field of view of the camera. Once the detected target fills the field of view of the camera, the tracker causes the television camera to move away from the details of the target toward the center of the target mass. For example, where the target details of interest are the numbers on a ship, once the field of view is filled, the television camera tends to move towards the main superstructure.

A gated centroid tracker could track an enclosed high light portion of a target and track it even after the target exceeds the field of view of the camera. However, gated centroid trackers have the same likelihood of breaking block when the field of view changes as do the edge boundary trackers.

The most commonly used tracker is the "split gate" tracker. It can track a large, slow moving target at signal to noise ratios of 1:1. However, this low noise performance requires a manually controlled gate size. When automatic gate size is added, the noise performance is less dramatic and system complexity is increased. The loop response of these trackers is a function of the signal to noise ratio, and of the target shape. For small targets, the loop response may be insufficient to maintain lock. These trackers are also poor at maintaining lock during field of view changes.

Patented prior art examples of these and other video trackers are U.S. Pat. Nos. 3,733,434—Weinstein; 3,769,456—Woolfson; 3,823,261—Bolsey; 3,890,462—Limb et al; 3,903,361—Alpers; 3,932,703—Bolsey; 3,950,611—Callis et al; 3,953,670—Prince; 3,988,534—Sacks; 4,004,083—Norem; 4,034,208—Vaeth et al; 4,053,929—Collins, III et al; and 4,060,830—Woolfson.

Accordingly, it is a general object of the invention to provide a system to automatically track a complex scene by storing the scene during one video frame and comparing subsequent frames of the scene with the stored reference to detect the direction and magnitude of motion.

It is a further object of the invention to provide a correlation type tracker which is relatively free of undue complexity, which has the capability of operating in real time, and which is effective.

Another object of the invention is to provide a video tracker which is well suited to the task of stabilizing a complex scene viewed from a moving vehicle, such as an aircraft.

It is still another object to provide such a correlation tracker which is particularly well suited to the requirements of avionic equipment, such as small size and weight, operability over a wide temperature range, and high reliability.

It is still another object of the invention to provide such a video tracker which provides an error signal output which varies in a fairly continuous manner, as opposed to the step-wise manner of typical prior art cross-correlation video trackers.

SUMMARY OF THE INVENTION

Briefly stated, and in accordance with the invention, elements from one frame of an incoming video signal are stored to establish a reference, and these stored elements are compared to elements from a subsequent frame of the video signal to generate an error signal. Significantly, only a single pair of cross-correlations are calculated for each of two orthogonal axes. For each axis an error signal is calculated which is dependent upon the difference of two cross-correlation signals, this difference being zero when there has been no relative movement. Where movement has occurred, the sign and magnitude of this difference respectively represent the direction and angular distance of movement. More specifically, for each axis, one of these cross-correlations is of the elements of the reference frame and the subsequent frame relatively shifted a fixed amount in one direction, and the other cross-correlation is of the reference frame and the subsequent frame relatively shifted in the opposite direction.

In an important aspect of the invention, it is recognized that the amount of decorrelation with a given shift in position can vary drastically (for example 1,000:1) with a change in scene content such as target size, and that gain compensation is required as a practical matter to maintain feedback loop stability. To provide gain compensation, the cross-correlation difference signal mentioned above is divided by an autocorrelation difference signal dependent upon the autocorrelation of the elements of a representative frame of the video signal at a substantial zero shift and at a predetermined shift. The representative frame of the video signal may for example be the subsequent frame itself. The autocorrelation function may be expected to have a shape similar to the cross-correlation function. Thus, the resultant output error signal from the division stage is largely dependent upon the absolute degree of scene movement, and not upon the target size.

In specific implementations of the invention, a considerable simplification is achieved by digitizing the incoming video waveform into binary signal states. This permits a great simplification in the actual hardware required. Specifically, the required multiplication can be accomplished by a digital EXCLUSIVE OR gate, partial subtraction is accomplished through simple NAND gates, integration and partial subtraction is accomplished by up/down counters, and division is accomplished with programmable counters.

It is another important aspect of the invention that the stored reference is effectively moved in response to the error signal, whereby the stored reference frame is effectively moved in response to the error signal. The stored reference frame then remains centered with respect to incoming scene data. In a practical implementation, effective movement of the reference may conveniently be accomplished through a memory addressing scheme including an eight bit digital adder.

Briefly stated, and in accordance with one aspect of the invention, a device for deriving a signal indicative of the direction and distance of movement between successive video frames includes an input for receiving a video signal, and means for storing elements from a frame of the video signal to establish a reference. A means comparing elements from a subsequent frame of the video signal with the stored reference elements generates a difference signal representing the difference between a pair of cross-correlation signals dependent on the correlations of the subsequent frame elements and the stored reference elements at two predetermined opposite relative shifts. A means is responsive to this difference signal for generating an error signal indicative of the amount of shift required to center the stored reference frame with respect to the subsequent frame. A means effectively moves this stored reference by an amount which is a function of the error signal, and the error signal is also outputted to the camera servos.

The means responsive to the error signal is also responsive to a gain control signal which represents the difference between a pair of autocorrelation signals dependent upon the correlations of the elements of a representative frame of the video signal at substantially a zero shift and at a fixed predetermined shift. The representative frame of the video signal may be either the subsequent frame or the stored reference frame.

Additionally, the invention contemplates the methods described herein of generating positional error signals.

ing stored reference signal designated $f_{HREF}(x+x_\epsilon, y+y_{68})$ received from a moving reference memory 26.

Before proceeding further, it should be noted that since an integrator is a linear operator, the multiplied signals may be subtracted before integration, even though equation (2) above suggests that integration be done before subtraction. This greatly simplifies the hardware required. Accordingly, the signals from the multipliers 20 and 22 are subtracted in a subtracter 28, with the $R_c(+A)-R_c(-A)$ output of the subtracter 28 supplied to a single integrator 30. A means, generally designated 32, but which more particularly may be seen to comprise a divider 34 and which is hereinafter described in greater detail, is responsive to the difference signal $R_c(+A)-R_c(-A)$ for generating an error signal $x_\epsilon$ indicative of the amount of shift required to horizontally center the stored reference frame with respect to the subsequent frame. Accordingly, the error signal $x_\epsilon$ is applied to the moving reference memory 26 to cause it to generate the appropriate output. In FIG. 4 it will also be seen that the moving reference memory 26 receives another error signal, $y_\epsilon$, which is indicative of the amount of shift required to center the reference in the vertical (elevation) direction. Trackers according to the present invention advantageously separate the tracking problem into two separate loops for horizontal and vertical tracking. There is, however, some interaction between the loops. Specifically, the moving reference memories of both loops receive complete error information.

The corresponding portion of the system for tracking in the vertical (elevation) orientation is depicted in FIG. 5, with corresponding elements denoted by primed reference numerals. The system functional elements of FIG. 5 are substantially identical to those of FIG. 4, with the exception that the multipliers 20' and 22' respectively receive input signals $f_{VSCENE}(x,y+A)$ and $f_{VSCENE}(x,y-A)$. The error signal from the means 32 is correspondingly denoted $y_\epsilon$.

As thus far described, the difference in the values of the cross-correlation function as $\Delta x = \pm A$ indicates the direction of the image shift, but does not give reliable indication of the magnitude of this shift. This unreliable magnitude indication occurs because the actual shape of the cross-correlation function is related to the content of the scene. If not compensated for, there would be a wide variation in the loop gains of the two servo loops, making these loops impossible to stabilize over a useful range of scene changes. In particular, the slope of the cross correlation function of FIG. 1 is proportional to uncompensated loop gain at any particular point.

Accordingly, in a particularly important aspect of the invention, a gain control signal is generated, and this gain control signal is taken into account by the means 32 and 32' for generating the respective error signals $x_\epsilon$ and $y_\epsilon$.

The particular gain control signal employed in the present system is derived from the autocorrelation function as depicted in FIG. 6 and relies upon the autocorrelation function having a shape similar to the cross-correlation function near zero shift. In FIG. 6, the magnitude B from the autocorrelation function maximum to the autocorrelation function value at a shift of either $-A$ or $+A$ is indicative of the slope (approximated to a straight line) of the upper part of the illustrated autocorrelation function. In accordance with the invention, a gain control signal is representative of the difference between the autocorrelation signal of the elements of a representative frame of the video signal at a shift of zero (maximum correlation) and the autocorrelation of the elements of the representative frame of the video signal at a predetermined shift, which preferably is the same shift used for the cross correlation function. This difference, denoted B, is divided into the loop gain by the divider 34 such that the error signals $x_\epsilon$ and $y_\epsilon$ tend to be independent of scene content.

The representative scene which is autocorrelated is preferably the subsequent scene itself, but may as well be the stored reference frame which presumably is a similar scene has a very similar autocorrelation function shape.

The illustrations of FIG. 7 depict this difference autocorrelation function. On the left hand side of FIG. 7, depicting a shift of zero, there is complete correspondence in the two identical overlapped target shapes and the entire area of the representative target shape represents the value or magnitude of the autocorrelation function. In the right hand portion of FIG. 7, the shaded area represents the value or magnitude of the autocorrelation function at a shift of $+A$. The difference between $R_{AUTO}(0)$ and $R_{AUTO}(+A)$ is then the gain control signal $B_x$.

In the lower portions of the system conceptual block diagrams of FIGS. 4 and 5, autocorrelators/subtracters generally designated 36 and 36' generally comprise input multipliers 38 and 38' which respectively receive the unshifted subsequent scenes denoted by the signals $f_{HSCENE}(x,y)$ and $f_{VSCENE}(x,y)$ and the shifted scenes, $f_{HSCENE}(x+A,y)$ and $f_{VSCENE}(x,y+A)$. The multiplier 38 and 38' outputs are then supplied to integrators 40 and 40'. The outputs of the integrators 40 and 40', representing the respective shifted autocorrelation signals $R_{AUTO}(+A)$ are supplied to the subtrahend $(-)$ inputs of subtracters 42 and 42', which also receive at their minuend $(+)$ inputs a signal equal to the magnitude of the autocorrelation function at a shift of zero. THe outputs of these subtractors 42 and 42' are then the respective horizontal and vertical channel gain control signals $B_x$ and $B_y$. The gain control signals $B_x$ and $B_y$ are connected to the divisor inputs of the dividers 34 and 34'. It should be noted that $R_{AUTO}(0)$ is equal to the total number of pixel elements.

The mathematical expression for the autocorrelation difference function, where the representative frame is the subsequent frame, is as follows:

$$B_x = R_{AUTO}(0) - R_{AUTO}(+A) = \int_{AREA} (f_{SCENE}(x,y))^2 \, dydx - \int_{AREA} f_{SCENE}(x,y) \cdot f_{SCENE}(x+A,y) \, dydx \quad (3)$$

The error signal for the horizontal or azimuth tracking channel is then $$x_\epsilon = R_c(+A) - R_c(-A)/B_x \quad (4)$$

A specific hardware embodiment of the video tracker system of FIGS. 4 and 5 will now be considered. While the specific hardware embodiment described herein is a particularly advantageous one, it will be appreciated that numerous other approaches are possible. At the outset, it should be noted that a considerable simplification of the practical embodiments results from digitalizing the video signal levels into threshold detected black and white video represented by two signal states.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings in which:

FIG. 1 is a curve of a typical cross correlation function useful in illustrating the principles of the invention;

FIGS. 2A, 2B and 2C are illustrations of hypothetical scenes for which cross correlation functions are calculated where there has been no movement of the scene;

FIGS. 3A, 3B and 3C are similar depictions where the scene has moved in the horizontal direction;

FIG. 4 is a conceptual block diagram of a horizontal axis processing channel according to the invention;

FIG. 5 is a similar conceptual block diagram of a vertical axis processing channel according to the invention;

FIG. 6 is a similar curve, similar to that of FIG. 1, but of an autocorrelation function, also useful in illustrating the principles of the invention;

FIG. 7 is a depiction, similar to that of FIGS. 2C and 3C, showing the calculation of an autocorrelation difference signal;

FIGS. 11, 11B and 11C depict one form of memory organization suitable for use in a cross correlation tracker according to the invention;

FIG. 12 is a partial block diagram of clock circuitry for use in the embodiments of the invention;

FIG. 13 is a block diagram of an alternative input arrangement for the video processing circuitry of FIG. 10; and FIG. 14 is a block diagram of an alternative error processor arrangement for use instead of the arrangement of FIG. 8.

DESCRIPTION OF THE PREFERRED EMBODIMENTS

Figure 8:
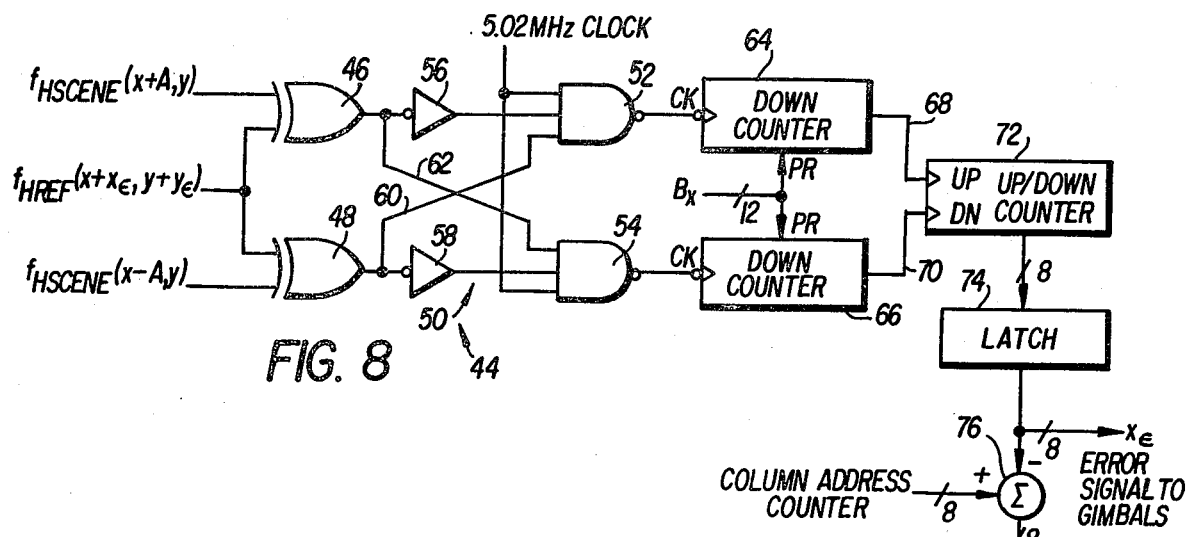
FIG. 8 is a digital logic schematic diagram of one of two error processors in an actual embodiment of the system depicted in FIGS. 4 and 5.

Referring first of FIG. 1, there is shown the shape of a typical cross-correlation function of a stored reference scene and a subsequent scene shifted in the x (horizontal or azimuth) direction only. The mathematical expression for this function is as follows:

$$R_c(\Delta x) = \int_{AREA} f_{REF}(x,y) \cdot f_{SCENE}(x + \Delta x, y) dy dx \quad (1)$$

Referring now in addition to FIG. 1, to FIGS. 2A through 2C and FIGS. 3A through 3C, the manner in which the present invention utilizes the cross-correlation function will be described.

First, it will be assumed that the scene has not changed position since the reference frame was stored. To illustrate this, FIG. 2A illustrates a hypothetically shaped target (dash lines) stored as part of the reference frame and FIG. 2B illustrates a similar, in this case identical, target (solid lines) which is part of the subsequent scene. The targets of FIGS. 2A and 2B are in vertical alignment to indicate there has been no shift in horizontal position. In FIG. 2C, the reference frame and the subsequent scene frames are shown shifted by two predetermined opposite relative shifts, $+A$ and $-A$. From FIG. 1 it can be seen that the magnitudes of the cross-correlation function at these two points are identical. Correspondingly, in FIG. 2C it can be seen that the areas of overlap (shaded), representing the cross-correlations, are the same. If each pixel value in one frame, for example the reference frame, is multiplied by the corresponding pixel value in the other frame, in this example the subsequent scene, and the product integrated over the area of the complete scene to generate the values of the two cross-correlation functions, $R_c(+A)$ and $R_c(-A)$ are generated. Hence, the difference between these two cross correlation functions, are $R_c(+A)-R_c(-A)$, is zero. The positional error signal output, proportional to this difference, is also zero.

The situation will now be considered where the subsequent scene has shifted to the right by an amount m as is depicted in FIGS. 3A and 3B. In this case, when pixels from the subsequent frame of the video signal are compared with the elements of the stored reference to generate the difference between the two cross correlation values, from the function curve of FIG. 1 and from the depictions of FIG. 3C it can be seen that the value of the two cross-correlation functions $R_c(+A)$ and $R_c(-A)$ are different. Specifically, when the subsequent frame is shifted to the right relative to the reference frame (for a total shift of $+A+m$), the value of the correlation function is much less than when the subsequent frame is shifted to the left with respect to the reference frame (for a total shift of $-A+m$). The difference function $R_c(+A)-R_c(-A)$ is now non-zero. The sign of this difference, in this case, negative, indicates direction of the scene shift, and more specifically indicates the direction of movement (taking into account any sign inversions which be required) required to center the stored reference with respect to the scene of the subsequent frame. From this difference also may be determined the error signal to be outputted to the tracking servos.

From equation (1) above, it can be seen that the mathematical expression for this cross-correlation difference function is as follows:

$$R_c(+A) - R_c(-A) = \int_{AREA} f_{REF}(x,y) \cdot f_{SCENE}(x + A, y) dy dx - \int_{AREA} f_{REF}(x,y) \cdot f_{SCENE}(x - A, y) dy dx \quad (2)$$

Accordingly, suitable hardware is required to calculate the value of this cross-correlation difference function.

The principles of the invention as thus far described are implemented in the upper part of the conceptual block diagram of FIG. 4 wherein two input signals $f_{HSCENE}(x+A,y)$ and $f_{HSCENE}(x-A,y)$ are applied to multiplier elements 20 and 22 of a cross-correlator/subtractor/divider generally designated 24. The upper of these two inputs has new input video scene data shifted to the right by an amount A and the other has the scene data shifted to the left by an amount A. These two scenes are each multiplied pixel by the pixel by a mov- In FIG. 8 there is illustrated circuitry suitable for the cross-correlator/subtracter/divider 24 of FIG. 4 which generates the horizontal error signal $x_\epsilon$. Although not illustrated herein, it will be appreciated that the embodiment of the cross-correlator/subtracter/divider 24' for the vertical processing channel may be identical, differing only in the input signals applied thereto.

As previously noted, in a simplification of the circulation of the difference cross-correlation function represented by equation (2), the conceptual system of FIG. 4 performs the subtraction in subtracter 28 prior to the integration, contrary to the order which is implied from equation (2). This is possible because an integrator is a linear operator. In the FIG. 8 hardware embodiment, a further simplification is accomplished by distributing the overall subtraction function over a number of elements. As a practical matter, this reduces the size of the digital counters required. Accordingly, it will be appreciated that the FIGS. 4 and 5 system concept block diagrams are in one sense conceptual ones, and there need not be precise one-for-one correspondence between the elements of FIGS. 4 and 5 and the actual embodiment. It is the functions depicted in FIGS. 4 and 5 which are important. However, this should no way be taken to imply that such one-for-one correspondence is not possible if it is desired to construct a system in such a manner.

In FIG. 8, it is assumed that the three input signals $f_{HSCENE}(x+A,y)$, $f_{HREF}(x+x_\epsilon, y+y_\epsilon)$ and $f_{HSCENE}(x-A,y)$ are all serial binary bit streams representing the elements of the respective video frames. The generation of these binary bit streams is described below with particular reference to FIG. 10. In FIG. 8, a logic means, generally designated 44, receives the serial binary bit streams and performs a multiplying function and a partial subtraction function. The logic means 44 compares each of the bits of the $f_{HREF}$ stream with the simultaneously received bits of each of the shifted versions of $f_{HSCENE}$. The logic means 44 generates a first output signal, specifically a horizontal count up signal when the bits of one comparison are identical, indicating correlation for $\Delta x = +A$ and at the same time bits of the other comparison are not identical indicating no correlation for $\Delta x = -A$. Similarly, a second output signal, specifically a horizontal count down signal, is generated when the bits of the other comparison are identical, indicating correlation for $\Delta x = -A$, and at the same time the bits of the one comparison are not identical, indicating no correlation for $\Delta x = +A$. No output results when the results of both comparisons are the same. That is, when there is correlation at both $\Delta x = \pm A$, or correlation at neither $\Delta x = \pm A$. This technique of generating no output when the results of both comparisons are the same is in effect partial subtraction and avoids the need to accumulate in counters two fairly large numbers which would then merely be subtracted.

Specifically, the logic means 44 comprises a pair of binary digital multipliers comprising EXCLUSIVE OR gates 46 and 48. If the two video signal levels are designated $-1$ and $+1$, the following comparison of an EXCLUSIVE OR gate truth table (following output inversion) with a multiplier function table demonstrates how the EXCLUSIVE OR gates 46 and 48 perform a multiplication function:

| EXCLUSIVE OR (With output inversion) | | BINARY MULTIPLIER | |
|---|---|---|---|
| Inputs | Output | Inputs | Output |
| L L | H | $-1\ -1$ | $+1$ |
| L H | L | $-1\ +1$ | $-1$ |
| H L | L | $+1\ -1$ | $-1$ |
| H H | H | $+1\ +1$ | $+1$ |

The logic means 44 additionally comprises a digital logic network, generally designated 50 responsive to multiplier 46 and 48 output signals for generating the first and second output signals as described above. More particularly, the digital logic network 50 comprises a pair of three-input NAND gates 52 and 54 as output stages, and a pair of inverters 56 and 58 interposed between the outputs of the respective EXCLUSIVE OR gates 46 and 48 and inputs of the NAND gates 52 and 54. Each of the NAND gates 52 and 54 also has a cross coupled input via a line 60 or 62 to the output of the opposite one of the EXCLUSIVE OR gates 46 and 48, as well as an input from a 5.02 MHz clock line.

In the operation of the digital logic network 50, when the outputs of the two EXCLUSIVE OR gates 46 and 48 are the same, both of the NAND gates 52 and 54 have at least one logic low input, preventing the gates 52 and 54 from being activated. For example, if the output of the upper EXCLUSIVE OR gate 46 is low, indicating correlation between the pixels of $f_{HSCENE}(x+A,y)$ and $f_{HREF}$, and the output of the lower EXCLUSIVE OR gate is also low, indicating correlation betwen the particular pixel of $f_{HREF}$ and the particular pixel of $f_{HSCENE}(x-A,y)$, then the lower NAND gate 54 is inactive due to a logic low on the line 62, and the upper NAND gate 52 is inactive due to a logic low at the output of the inverter 56. Thus unnecessary count accumulation in the subsequent counters is avoided. If the EXCLUSIVE OR gates 46 and 48 outputs are different, then the NAND gate 52 or 54 corresponding to whichever EXCLUSIVE OR gate 46 or 48 has a low output is activated through the inverter 56 or 58 to generate an output pulse, while the other NAND gate 52 or 54 is inactivated.

In FIG. 8, there are also a pair of division counters 64 and 66 each having a clock (CK) input responsive to one of the logic means 44 output signals, and each having a preset (PR) input for receiving a digital number representing the gain control signal. The division counters 64 and 66 are each arranged such that a respective division counter output signal along a line 68 or 70 is generated each time a number of clock input pulses equal to the number representing the gain control signal $B_x$ have been accumulated. More particularly, in the specific embodiment, the division counter 64 and 66 are down counters which output terminal counts of their respective output lines 68 and 70 upon reaching a zero count and which receive at their preset (PR) inputs, the 12 bit $B_x$ input representing the gain control signal. It kwill be appreciated that the number of output pulses over an entire video frame on the lines 68 and 70 represents the number of clock pulses on the CK inputs divided by the number $B_x$. It should be noted that the division counters 64 and 66 are not automatically reset between frames, so that rounding errors which would otherwise result due to division remainders remaining in the division counters 64 and 66 average out over a number of frames.

The output lines 68 and 70 of the division counters 64 and 66 are applied to count up (UP) and count down (DN) clock inputs of an up/down counter 72, which more particularly is an eight bit, dual clock, up/down counter. In operation, as the up/down counter 72 counts up and down, it performs the second part of the subtraction represented by the subtractor 28 of FIG. 4, as well as the summation portion of the integration process.

The eight bit output of the up/down counter 72 represents the output of the divider 34 of FIG. 4, the accumulated count in the up/down counter 72 being the result of the overall integration, subtraction and division operation of the cross-correlator 24 of FIG. 4. Since this output is only meaningful after integration over an entire video frame, an eight bit latch 74 is provided at the output of the up/down counter 72 to receive and store each accumulated count.

The output of the latch 74 is the $x_\epsilon$ error signal which is output to the servo-gimbals which control the television camera, and additionally is applied to a subtraction (−) input of a digital adder 76 which computes shifted memory addresses for the moving reference memory 26 in a manner hereinafter described in more detail with particular reference to FIG. 10.

Figure 9:
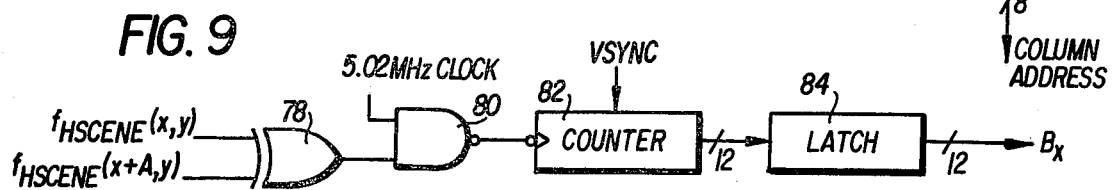
FIG. 9 is a digital logic schematic diagram of an autocorrelater suitable for use in the system of FIGS. 4 and 5.

In FIG. 9, there is illustrated one form of an autocorrelator/subtractor which may be employed as the autocorrelator/subtractor 36 of FIG. 4. Although in FIG. 4, a subtraction operation is indicated at 42, a considerable simplification is employed in the preferred embodiment of FIG. 9 wherein only pixels which are not correlated between the scene data ($f_{HSCENE}(x,y)$) and the shifted scene data ($f_{HSCENE}(x+A,y)$) are counted. The net result is equivalent to the expression $R_{AUTO}(0) - R_{AUTO}(+A)$.

More specifically, an EXCLUSIVE OR gate 78 receives at its upper input the bit stream $f_{HSCENE}(x,y)$ representing the elements of the representative frame, and simultaneously receives at its lower input the signal $f_{HSCENE}(x+A,y)$ representing the elements of the representative frame shifted to the right by A bits. The output of the EXCLUSIVE OR gate 78 is high when the two inputs are different, indicating no correlation. The output of the EXCLUSIVE OR gate 78 is applied to the lower input of a NAND gate 80 which receives at its upper input the 5.02 MHz clock line. The pulses at the output of the NAND gate 80 are accumulated in a digital counter 82, which is reset each television field by a VSYNC signal. Since the count accumulated in the counter 82 is meaningful only at the end of a television field, an output latch 84 stores this count, representing the $B_x$ signal, at the end of each field.

Figure 10:
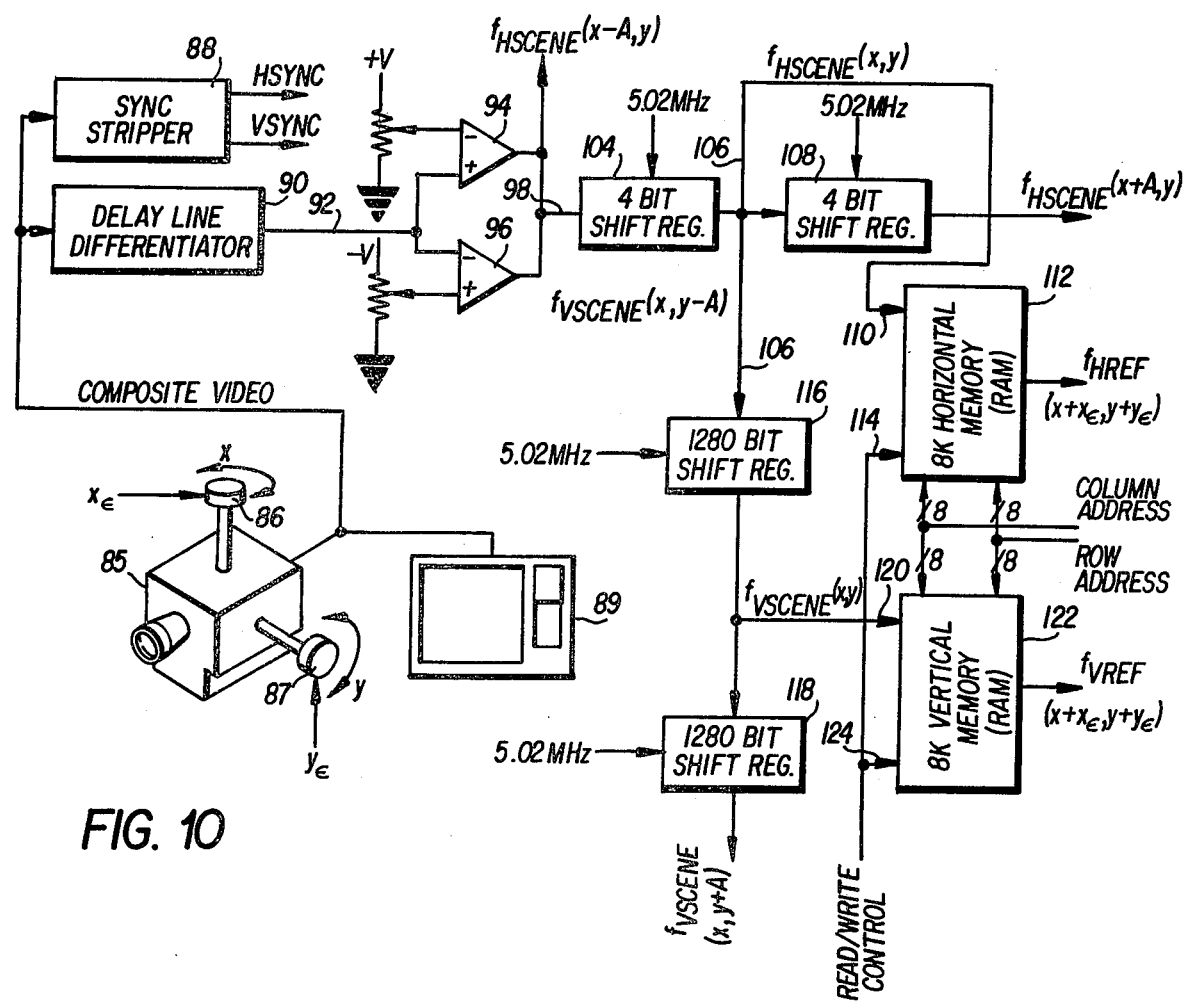
FIG. 10 is a block diagram of video processing, scene shifter and memory portions of an embodiment of the system of FIGS. 3 and 4, including a television camera input.

FIG. 10 illustrates circuitry receiving a composite video signal from a sensing means 85, more particularly comprising a television camera 85, and processing this composite video signal to generate the various shifted scene data. FIG. 10 additionally illustrates the memory circuitry for the moving reference memories 26 and 26′ of FIGS. 4 and 5. Mechanically corrected to the camera 85 are servo-gimbals 86 and 87 responsive respectively to the $x_\epsilon$ and $y_\epsilon$ error signals for moving the camera 85 to track the target.

In FIG. 10, the composite video signal is applied to a conventional television sync stripper 88 which generates HSYNC and VSYNC pulses, as well as to a video monitor 89. Preferably, edge enhancement of the video signal is employed to increase the detail in the scene processed by the correlation tracker system. Accordingly, the composite video signal is applied to the input of a delay line differentiator 90 which comprises a transmission line shorted at the far end. The output line 92 of the delay line differentiator 90 carries, for each video transition, a pair of pulses separated by approximately two microseconds. The edge-enhanced video on the output line 92 is both positive and negative with a zero average. In order to detect this video, a pair of comparators 94 and 96 are employed, feeding a common output line 98. The reference inputs to the comparators 94 and 96 are connected to respective adjustable reference voltage dividers 100 and 102 supplied by appropriate positive (+V) and negative (−V) voltages. It will be appreciated that the comparators 94 and 96 serve to digitize into binary signal levels all of the incoming video, which subsequently is stored in the memories and processed by the remainder of the circuitry which is based on digital logic. As previously mentioned, this digitizing of the incoming video waveform into binary signal levels is an important aspect in the simplification of the actual hardware which implements the concepts of the invention.

The signal appearing on the line 98 as the composite video scans line by line is arbitrarily designated $f_{HSCENE}(x-A,y)$ meaning this line 98 carries a binary digital bit stream representing scene data shifted four bits to the left. The line 98 is applied to the input of a delay element 104, which preferably comprises a four bit shift register clocked by a 5.02 MHz clock signal. The output of the clocked shift register 104 supplies a line 106 which bears two designations, $f_{HSCENE}(x,y)$ and $f_{VSCENE}(x,y-A)$, depending upon whether the line 106 is used for its horizontal tracking channel information or its vertical tracking channel information.

Considering first the horizontal channel, the designation $f_{HSCENE}(x,y)$ indicates that the binary digital video waveform appearing on line 106 represents the incoming scene data with zero shift (which as herein employed is an arbitrary designation with reference to $f_{HSCENE}(x-A,y)$ appearing on the line 98).

The $f_{HSCENE}(x,y)$ line 106 is applied to the input of another delay element 108 comprising another four bit clocked shift register which generates at its output the $f_{HSCENE}(x+A,y)$ data, representing the elements of the scene shifted to the right by an amount A. The $f_{HSCENE}(x,y)$ line 106 is also applied to a data input 110 of an 8K by one bit horizontal memory 112, which may comprise an integrated circuit random access memory (RAM) integrated circuit. The memory 112 also receives at an input 114 a READ/WRITE control line. It will be appreciated that the horizontal memory 112, together with the address generation circuitry of FIGS. 8 and 12, hereinafter described in detail, generally corresponds to the moving reference memory 26 of FIG. 4.

For the vertical processing channel, the data on the line 106 is also arbitrarily designated $f_{VSCENE}(x,y-A)$, designating scene data which is shifted upwardly by a shift of −A (assuming a top to bottom raster scan). In the present system, each horizontal line of the video frame is divided into 320 pixels. Accordingly, to generate a four line delay, a delay element 116 comprising a 1280 bit clocked shift register 116 is employed, the output of which is a line designated $f_{VSCENE}(x,y)$. The $f_{VSCENE}(x,y)$ line carries video data which has zero shift in the vertical direction with reference to the line 106. To generate the delayed vertical scene data (shifted down), another delay element comprising a 1280 bit clocked shift register 118 receives the $f_{VSCENE}(x,y)$ data and generates $f_{VSCENE}(x,y+A)$ data.

The $f_{VSCENE}(x,y)$ line also supplies a data input 120 of a vertical memory 122, which may be identical to the horizontal memory 112. Like the horizontal memory 112, the vertical memory 122, together with its address generation circuitry, generally correspond to the moving reference memory 26' of FIG. 5. The vertical memory 122 also has an input 124 receiving a READ/WRITE control line.

The READ/WRITE control line is supplied from external control circuitry, not specifically described in detail herein, which controls whether the video tracker system is in an acquisition mode or in a tracking mode.

The horizontal and vertical memories 112 and 122 receive a pair of 8 bit address lines designated COLUMN ADDRESS and ROW ADDRESS. In order to produce effective movement of the video frame stored in the memories 112 and 122, the error signals $x_\epsilon$ and $y_\epsilon$ are utilized in the generation of these memory addresses.

Referring back to FIG. 8 wherein the implementation of the horizontal channel is depicted, it can be seen that the digital adder 76 receives the $x_\epsilon$ error signal, and combines this $x_\epsilon$ error signal with the signal on a line designated COLUMN ADDRESS COUNTER to generate the actual 8-bit COLUMN ADDRESS which addresses the data in the memories 112 and 122 of FIG. 10. The generation of the COLUMN ADDRESS COUNTER signal is described below with particular reference to FIG. 12. Although not specifically illustrated, it will be appreciated that a corresponding arrangement generates the row address from the $y_\epsilon$ error signal generated by the vertical processing circuitry.

The memory organization will now be described in greater detail with reference to FIGS. 11A, 11B and 11C. As essentially the same information is stored in both memories, it would be quite possible to use a single moving reference memory shared by both the horizontal and vertical channels. However, two advantages in particular are realized by the use of separate memories, and such integrated circuit memories are readily available at relatively low cost. One advantage is a reduction in complexity as the use of separate memories allows simultaneous addressing of the memories by the horizontal and vertical channels, avoiding the need for circuitry to avoid address conflicts. An additional advantage, as is represented by FIGS. 11A, 11B and 11C is that the resolution elements may be different for the two memories. For greater sensitivity to motion in the horizontal direction, the horizontal memory 112 has better resolution in the horizontal direction as may be seen from the shape of the horizontal resolution element of FIG. 11C. Similarly, the vertical memory 122, which is used to detect motion in the vertical direction, has better resolution in the vertical direction, may be seen from the shape of the vertical resolution element of FIG. 11B.

To simplify operation in combination with the interlaced scanning of a standard television frame, the present system does not distinguish between adjacent lines which result from successive odd and even scans. Accordingly, the 2 TV line height of the vertical resolution element of FIG. 11B is the best available in the present system, and may be derived from a single scanning line, either odd or even. Similarly, the 4 TV line height of the horizontal resolution elements of FIG. 11C may be derived from a pair of lines, from either an odd or even raster scan. It will be seen that the required number of vertical and horizontal resolution elements may be accommodated within the 525 lines, each of 63.49 microseconds duration, comprising a standard television frame.

In FIG. 12 is shown the clock generator portion of the illustrated embodiment. The clock generator basically comprises a standard phase locked loop television sync generator. The sync generator is based on a standard sync generator integrated circuit 126, which may comprise a National Semiconductor Type No. MM5320. The phase locked loop more particularly may be seen to comprise an approximately 5.02 MHz voltage controlled oscillator (VCO) 128 receiving the output of a phase detector 130, and supplying a 1.26 MHz input line of the sync generator 126 through a digital divide-by-four element 132. The phase detector 130 receives the HSYNC signal from the sync stripper 88 of FIG. 10, as well as a 15.75 kHz horizontal drive (HDRIVE) signal from the sync generator IC 126. The sync generator IC 126 also receives the VSYNC output from the sync stripper 88 of FIG. 10, and generates an approximately 60 Hz VDRIVE signal.

An output of the FIG. 12 clock generator is the 5.02 MHz clock line which is employed to synchronize the rest of the tracker system circuitry. Other important outputs from the clock generator of FIG. 12 are the COLUMN ADDRESS COUNTER line and the ROW ADDRESS COUNTER line, taken respectively from a column address counter 134 and a row address counter 136.

Considering first the column address counter 134 which controls memory addressing for the horizontal tracking channel, the counter 134 is clocked from the 5.02 MHz clock line, and reset at the beginning of every horizontal line by the 15.75 kHz DRIVE signal. The row address counter 136 is clocked by the 15.75 kHz HDRIVE signal, and is reset once every frame by the 60 kHz VDRIVE signal.

It is a characteristic of both of these counters 134 and 136 that a reset input does not set the counters to zero. Rather the counters 134 and 136 are reset to a negative number selected such that a count of zero occurs in the center of the video frame. The COLUMN ADDRESS COUNTER output line is applied to the digital adder 76 of FIG. 8, and the ROW ADDRESS COUNTER line is applied to a similar digital adder (not shown), associated with the vertical axis channel. Each of these lines is actually eight bits wide.

Considering now the operation of the embodiment described above with reference to FIGS. 1 through 12, initially the system is in a manual track mode wherein the $x_\epsilon$ and $y_\epsilon$ inputs to the servo-gimbals 86 and 87 are controlled by an operator via a joy stick (not shown), rather than by the output of the tracker. The READ/WRITE control line of FIG. 10 allows the memories 112 and 122 to continually receive and store incoming video data from $f_{HSCENE}(x,y)$ and $f_{VSCENE}(x,y)$. In this mode, the servo-gimbals 86 and 87 are in a coast condition wherein, without manual input, each servo-gimbal continues to move with past velocity and acceleration. The operator can use the joy stick to bring the more favored position on the monitor 89.

When the operator desires to place the system in the automatic tracking mode, he actuates a control input which causes the external system controller to change the READ/WRITE control line to a condition which causes the most recent scene data to remain stored in the memories 112 and 122 of the reference scene, and causes the memories 112 and 122 comprising the moving reference memories 26 and 26' of FIGS. 4 and 5 to begin outputting data as data elements are addressed at the COLUMN ADDRESS and ROW ADDRESS inputs. As each subsequent video scene is received, it is processed by the cross-correlators/substractors/dividers 24 and 24' (FIGS. 4 and 5) and FIG. 8, to generate the difference signal $R_c(+A)-R_c(-A)$, and the $x_\epsilon$ and $y_\epsilon$ error signals.

The $x_\epsilon$ and $y_\epsilon$ error signals indicate the amount of shift required to center the stored reference frame with respect to each subsequent frame. Accordingly, the digital adder 76 (FIG. 8) substracts the $x_\epsilon$ error signal from the column address counter 134 (FIG. 12) output, to generate a shifted column address which effectively shifts the memory output. The row address for the memory is similarly generated. It should be noted that the particular sign conventions employed are not important, so long as they are consistent throughout the system. For example, in the disclosed system a scene shift to the right results in a negative or $x_\epsilon$ error signal which is subtracted from the COLUMN ADDRESS COUNTER data to yield a COLUMN ADDRESS which is increased. The same result would be obtained if the output of the integrator 30 were $R_c(-A)-R_c(+A)$, yielding a positive $x_\epsilon$ error signal for scene shifts to the right, and the $x_\epsilon$ error signal were added to COLUMN ADDRESS COUNTER.

The $x_\epsilon$ and $y_\epsilon$ error signals are also applied to the servo-gimbals 86 of FIG. 10 to produce the actual camera tracking operation. It will be appreciated that the servo-gimbals 86 and 87 must be adapted to receive the particular $x_\epsilon$ and $y_\epsilon$ error signals generated.

The integrators 30 and 30' of FIGS. 4 and 5, and more particularly, the up/down counter 72 of FIG. 8, are not reset each video field. Accordingly, the reference can move anywhere in the field of view and remain centered on the new data. The displacement of the moving reference becomes an error signal to the gimbal servo loop and the servo-gimbals 86 and 87 move the scene, with the reference following, until there is zero displacement.

As the scene shifts, the incoming scene data and the stored reference scene gradually become different such that the error signals generated by calculating the difference between the cross-correlation functions at two shifts become slightly degraded in accuracy. The cross-correlation will be equal to the autocorrelation function of the first frame after the scene is memorized. However, as decorrelation takes place due to magnification or roll, the cross-correlation function will become flattened and possibly skewed. (Even with decorrelation, the cross-correlation function will still maintain a maximum value near zero shift.)

Accordingly, it is preferably that the reference image be periodically updated under control of the external system digital controller by momentarily (for one video frame) interrupting the automatic tracking and updating the moving reference memories 25 and 26' of FIGS. 4 and 5, and more particularly the memories 112 and 122 of FIG. 10. This rapid updating does not introduce any appreciable error, and may occur in the order of once per second.

A modified embodiment of the threshold detector circuiry of FIG. 10 will now be described with reference to FIG. 13. More particularly, it may be desired to derive the reference input voltages for the comparators 94 and 96 from input conditions. In this embodiment, contrast enhanced video is applied through a buffer amplifier 138 to the input of the delay line differentiator 90, and additionally to an RMS noise detector 140 which preferably has an output voltage equal to four times the RMS value of the noise. This output is applied to the reference (−) input of the upper comparator 94 and through a linear inverting amplifier 142 to the reference (−) input of the lower comparator 96. Such a variable threshold system permits the system to achieve a fairly constant error rate.

Referring lastly to FIG. 14, an alternative embodiment to the cross correlator/subtractor/divider 24 of FIG. 8 will be described. An autocorrelator/subtractor/divider 142 of FIG. 14 is partly intended to illustrate that the system is conceptually outlined in FIGS. 4 and 5 is capable in taking a number of different embodiments. Additionally, the FIG. 14 approach, which is essentially a brute force approach for deriving the necessary cross-correlation and subtraction functions, serves to point up the particular advantages of the simplified implementation which the approach of FIG. 8 permits. More particularly, in the FIG. 14 embodiment, integration precedes subtraction, as is suggested by equation (2) above, and the subtraction is accomplished all at once, rather than in partial steps as in FIG. 8, thus necessitating larger counters.

In FIG. 14, the EXCLUSIVE OR gate multipliers 46 and 48 remain unchanged as well as the inverters 56 and 58. However, the outputs of the inverters 56 and 58 are supplied directly to two input NAND gates 144 and 156 with no cross coupling at the inputs. The 5.02 MHz clock line is also applied to the NAND gates 144 and 146.

In operation, when the EXCLUSIVE OR gates 46 and 48 detect correlation of the bits at their inputs, their outputs remain low. This activates the respective inverters 56 and 58, which cause the respective NAND gates 144 and 146 to provide output pulses when enabled by the 5.02 MHz clock line. Accordingly, the output of each of the NAND gates 144 and 146 represents the total number of bits which correlate between the horizontal scenes shifted in two directions with respect to the reference scene.

These outputs are applied to the clock (CK) inputs of a pair of counters 152 and 154. It will be appreciated that these counters require a much greater capacity than the counters of the FIG. 8 embodiment, because each potentially may accumulate nearly all of the bits in an entire frame, which amounts to over 8,000. The accumulated counts in these counters 152 and 154 represent the cross-correlation integration at the end of each TV field, and accordingly they are reset at the end of each TV field.

The outputs of the counters 152 and 154 are subtracted in a digital subtractor 156, the output of which is stored in a latch 158, and then applied to a digital divider 160 which receives the $B_x$ gain control input. It will be appreciated that a digital divider such as a digital divider 160, is a much more complex device than the simple up/down counter 72 of FIG. 8.

Lastly, the output of the digital divider 160 is applied to the latch 74 which stores $x_\epsilon$ error signal until the end of the subsequent frame, when it is updated. The operation of the latch 74 and of the digital adder 76 in FIG. 14 is the same as the operation of the corresponding elements of FIG. 8.

While specific embodiments of the invention have been illustrated and described herein, it is realized that modifications and changes will occur to those skilled in the art. It is therefore to be understood that the appended claims are intended to cover all such modifications and changes as fall within the true spirit and scope of the invention.

What is claimed is:

1. A device for deriving a signal indicative of the direction and distance of movement between successive video frames, said device comprising:
   an input for receiving a video signal;
   means for storing elements from a frame of the video signal to establish a reference;
   means comparing elements from a subsequent frame of the video signal with the stored reference elements for generating a difference signal representing the difference between a pair of cross-correlation signals dependent on the correlations of the subsequent frame elements and the stored reference elements at two predetermined opposite relative shifts;
   means for generating a gain control signal;
   means responsive to the difference signal and to the gain control signal for generating an error signal indicative of the amount of shift required to center the stored reference frame with respect to the subsequent frame; and
   means for outputting the error signal.

2. A device according to claim 1, further comprising means for effectively moving the stored reference by an amount which is a function of the error signal.

3. A device according to claim 1, which comprises separate processing channels for movement in a pair of orthogonal axes, and wherein the error signal has a respective pair of components.

4. A device according to claim 1, wherein said means for generating the gain control signal comprises means for comparing each of the bits of a stream representing the elements of the representative frame with simultaneously received bits of a stream representing the elements of the representative frame shifted, and for counting the number of comparisons for which the bits are different.

5. A device according to claim 1, wherein the gain control signal represents the difference between a pair of autocorrelation signals dependent upon the correlations of the elements of a representative frame of the video signal at substantially zero shift and at a fixed predetermined shift.

6. A device according to claim 5, wherein the representative frame of the video signal is the subsequent frame.

7. A device according to claim 5, wherein the representative frame of the video signal is the stored reference frame.

8. A device according to claim 5, wherein the two predetermined opposite relative shifts for the cross-correlation signals and the predetermined shift for the shifted autocorrelation signal are substantially equal.

9. A device according to claim 1, wherein said means for generating an error signal divides the difference signal by the gain control signal.

10. A device according to claim 9, wherein said means for storing stores binary digitized representations of the stored reference elements; and
    wherein said means for generating an error signal comprises:
    means for digitizing the elements of the subsequent frame of the video signal;
    means for generating a pair of oppositely shifted versions of the elements of one of the frames with respect to the elements of the other of the frames;
    means for generating serial binary bit streams representing the elements of said pair of oppositely shifted frames and representing the elements of said other of the frames;
    logic means receiving the serial binary bit streams and comparing each of the bits of the stream representing said other of the frames with the simultaneously-received bits of each of the shifted versions of said one of the frames for generating a first output signal when the bits of one comparison are identical and the bits of the other comparison are not identical, a second output signal when the bits of the other comparison are identical and the bits of the one comparison are not identical, and no output signal when the results of both comparisons are the same;
    a pair of division counters each having a clock input responsive to one of said logic means output signals, said division counters each having a preset input for receiving a digital number representing the gain control signal, and said division counters each arranged such that a respective division counter output signal is generated each time a number of clock input pulses equal to the number representing the gain control signal have been accumulated; and
    an up/down counter which counts in one direction in response to the output of one of said division counters and which counts in the opposite direction in response to the output of the other of said dimension counters;
    whereby the accumulated count in said up/down counter after all of the bits have been processed represents the error signal.

11. A device according to claim 10, wherein said one of the frames is the subsequent frame, and said other of the frames is the stored reference frame.

12. A device according to claim 10, wherein said logic means comprises a pair of binary digitized multipliers, one of said binary digital multipliers serially receiving the bits representing said other of the frames and the bits representing one shifted version of said one of the frames, and the other of said binary digital multipliers serially receiving the bits representing said other of the frames and the bits representing the other shifted version of said one of the frames, each of said digital multipliers generating respective multiplier output signals in response to input bits which are identical.

13. A device according to claim 12, wherein said logic means further comprises a digital logic network responsive to the multiplier output signals and generating the first output signal when the multiplier outputs are different in a first sense and operating the second output signal when the multiplier outputs are different in a second sense.

14. A device according to claim 12, wherein said binary digital multipliers comprise EXCLUSIVE OR gates.

15. A device for deriving a signal indicative of the direction and distance of movement between successive video frames, said device comprising:
    an input for receiving a video signal;

means for storing elements from a frame of the video signal to establish a reference;

means comparing elements from a subsequent frame of the video signal with the stored reference elements for generating an error signal indicative of the amount of shift required to center the stored reference frame with respect to the subsequent frame, the error signal being dependent upon a signal representative of the difference between a pair of cross-correlation signals dependent on the correlations of the subsequent frame element and the stored reference elements at two predetermined opposite relative shifts, divided by a signal representative of the difference between a pair of autocorrelation signals dependent upon the autocorrelations of the elements of a representative frame of the video signal at substantially zero shift and at a predetermined shift; and means for outputting the error signal.

16. A device according to claim 15, further comprising means for effectively moving the stored reference by an amount which is a function of the error signal, whereby the stored reference frame is centered with respect to the subsequent frame.

17. A device according to claim 16, wherein the representative frame of the video signal is the subsequent frame.

18. A device according to claim 16, wherein the representative frame of the video signal is the stored reference frame.

19. A device according to claim 16, wherein the two predetermined opposite relative shifts for the cross-correlation signals and the predetermined shift for the shifted autocorrelation signal are substantially equal.

20. A device according to claim 16, which comprises separate processing channels for scene movement in a pair of orthogonal axes, and wherein the error signal has a respective pair of components.

21. A cross-correlation video tracker comprising:
sensing means for generating a video signal representing a scene which may be moving, said sensing means including controllable means responsive to a signal for moving said sensing means to track the scene;

means for receiving and storing elements from a frame of the video signal to establish a reference;

means comparing elements from a subsequent frame of the video signal with the stored reference elements for generating an error signal indicative of the amount of shift required to center the stored reference frame with respect to the subsequent frame, the error signal being dependent upon a signal representative of the difference between a pair of cross-correlation signals dependent on the correlations of the subsequent frame elements and the stored reference elements at two predetermined opposite relative shifts, adjusted by a gain control signal;

means for effectively moving the stored reference by an amount which is a function of the error signal, whereby the stored reference frame is centered with respect to the subsequent frame;

feedback means for supplying the error signal to said controllable means whereby said sensing means follows the scene.

22. A cross-correlation video tracker according to claim 21, which comprises separate processing channels for each of a pair of orthogonal axes.

23. A cross-correlation video tracker according to claim 21, wherein the gain control signal represents the difference between a pair of autocorrelation signals dependent upon the autocorrelations of the elements of a representative frame of the video signal at substantially zero shift and at a predetermined shift.

24. A cross-correlation video tracker according to claim 23, wherein the representative frame of the video signal is the subsequent frame.

25. A cross-correlation video tracker according to claim 23, wherein the representative frame of the video signal is the stored reference frame.

26. A cross-correlation video tracker according to claim 23, wherein the two predetermined opposite relative shifts for the cross-correlation signals and the predetermined shift for the shifted autocorrelation signal are substantially equal.

27. A method of deriving a signal indicative of the direction and distance of movement between successive frames of a video signal, said method comprising the steps of:

storing elements from a frame of the video signal to establish a reference; and comparing elements from a subsequent frame of the video signal with the stored reference elements and generating an error signal indicative of the amount of shift required to center the stored reference frame with respect to the subsequent frame, the error signal being dependent upon a signal representative of the difference between a pair of cross-correlation signals dependent on the correlations of the subsequent frame element and the stored reference elements at two predetermined opposite relative shifts, divided by a signal representative of the difference between a pair of autocorrelation signals dependent upon the autocorrelations of the elements of a representative frame of the video signal at substantially zero shift and at a predetermined shift.

28. A method according to claim 27, further comprising the step of effectively moving the stored reference by an amount which is a function of the error signal, thereby to center the stored reference frame with respect to the subsequent frame.

29. A method according to claim 27, wherein the representative frame of the video signal is the subsequent frame.

30. A method according to claim 27, wherein the representative frame of the video signal is the stored reference frame.

31. A method according to claim 27, wherein the two predetermined opposite relative shifts for the cross-correlation signals and the predetermined shift for the shifted autocorrelation signal are substantially equal.

32. A method according to claim 27, wherein error signals are generated for scene movement in each of a pair of orthogonal axes.

* * * * *